United States Patent [19]
Nishii et al.

[11] Patent Number: 5,634,697
[45] Date of Patent: Jun. 3, 1997

[54] HYDRAULIC BRAKE DEVICE FOR A VEHICLE

[75] Inventors: Michiharu Nishii, Toyota; Satoshi Ishida, Chiryu; Kenji Tozu, Yokkaichi, all of Japan

[73] Assignee: Aisin Seiki Kabushiki Kaisha, Kariya, Japan

[21] Appl. No.: 490,525

[22] Filed: Jun. 14, 1995

[30] Foreign Application Priority Data

Jun. 15, 1994 [JP] Japan .................... 6-133312

[51] Int. Cl.$^6$ .................... B60T 8/40
[52] U.S. Cl. .................... 303/116.1; 303/113.5; 303/119.1
[58] Field of Search .................... 303/116.1, 119.1, 303/114.1, DIG. 1, 113.1, 9.62, 113.5, 189

[56] References Cited

U.S. PATENT DOCUMENTS 4,800,289  1/1989  Adachi et al. .................... 303/116.1

FOREIGN PATENT DOCUMENTS

| 4213199 | 10/1993 | Germany | 303/116.1 |
|---|---|---|---|
| 56-10219 | 3/1981 | Japan . | |
| 64-47644 | 2/1989 | Japan . | |
| 4-193658 | 7/1992 | Japan . | |

*Primary Examiner*—Peter M. Poon
*Attorney, Agent, or Firm*—Burns, Doane, Swecker & Mathis, LLP

[57] ABSTRACT

A hydraulic brake device for a vehicle includes a reservoir for storing brake fluid, a master cylinder connected to the reservoir generating brake pressure responsive to an operation force of a brake pedal, a hydraulic power source connected to the reservoir generating hydraulic pressure responsive to the operation force of the brake pedal, a wheel brake for applying a brake force and a pressure control unit connecting the wheel brake to the master cylinder, the reservoir and the hydraulic power source to control brake fluid flow into the reservoir from the wheel brake and brake fluid flow into the wheel brake from the hydraulic power source. The pressure control unit includes a first valve disconnecting the wheel brake from the master cylinder and connecting the wheel brake to a hydraulic wheel brake passage, a second valve disconnecting the hydraulic wheel brake passage from the hydraulic power source and connecting the hydraulic wheel brake passage to the reservoir, a third valve disconnecting the second valve from the wheel brake, and an orifice for connecting the hydraulic power source to the first valve bypassing the second valve and the third valve device and restricting a quantity of the brake fluid which flows into the wheel brake from the hydraulic power source so that the quantity of the brake fluid flowing through the orifice to the wheel brake is smaller than the quantity of brake fluid which flows into the reservoir, from the wheel brake through the first, second and third valve valves.

4 Claims, 6 Drawing Sheets

HYDRAULIC BRAKE DEVICE FOR A VEHICLE

FIELD OF THE INVENTION

This invention relates to a brake system and more particularly a hydraulic brake system for a vehicle.

BACKGROUND OF THE INVENTION

A conventional hydraulic brake device for a vehicle is disclosed in Japanese Patent No. 56(1981)-10219 and Japanese Patent Laid Open No. 64(1989)-47644. The hydraulic brake device for a vehicle disclosed in the first document mentioned above includes a reservoir for storing brake fluid, a master cylinder connected to the reservoir for generating hydraulic pressure corresponding to the brake operation force, a hydraulic power source connected to the reservoir for generating hydraulic pressure corresponding to a brake operation force, a hydraulic wheel brake, and a pressure control device for effecting anti-lock control. The pressure control device for effecting anti-lock control usually connects the hydraulic wheel brake to the master cylinder. The pressure control device connects the hydraulic wheel brake to the hydraulic power source to control brake fluid flow into the reservoir from the hydraulic wheel brake and to control brake fluid into the hydraulic wheel brake from the hydraulic power source under the anti-lock control condition. The pressure control device comprises a first valve member connected to the wheel brake for switching from the master cylinder to the hydraulic power source, a second valve member for permitting brake fluid flow into the hydraulic wheel brake from the hydraulic power source and a third valve member for permitting brake fluid flow into the reservoir from the hydraulic wheel brake.

The hydraulic brake device disclosed in the second document identified above includes a reservoir for storing brake fluid, a master cylinder connected to the reservoir for generating hydraulic pressure corresponding to the brake operation force, a first hydraulic wheel brake, and a first pressure control device for effecting anti-lock control. The first pressure control device for effecting anti-lock control usually connects the first hydraulic wheel brake to the master cylinder. The first pressure control device connects the first hydraulic wheel brake to the hydraulic power source to control brake fluid flow into the reservoir from the first hydraulic wheel brake and to control brake fluid flow into the reservoir from the hydraulic wheel brake and to control brake fluid flow into the first hydraulic wheel brake from the hydraulic power source under the anti-lock control condition.

The hydraulic brake device also includes a second hydraulic wheel brake and a second pressure control device for effecting anti-lock control. The second pressure control device usually connects the second hydraulic wheel brake to the master cylinder. The second pressure control device connects the second hydraulic wheel brake to the hydraulic power source to control brake fluid flow into the reservoir from the second hydraulic wheel brake and to control brake fluid flow into the second hydraulic wheel brake from the hydraulic power source under the anti-lock control condition.

The first pressure control device comprises a first valve member connected to the first hydraulic wheel brake for switching the master cylinder to the hydraulic power source, a second valve member for permitting the flow of the brake fluid into the first hydraulic wheel brake from the hydraulic power source and a third valve member for permitting brake fluid flow into the reservoir from the first hydraulic wheel brake.

The second pressure control device comprises a first valve member for permitting brake fluid flow into the second hydraulic wheel brake from the hydraulic power source and a second valve member for permitting brake fluid flow into the reservoir from the second hydraulic wheel brake.

Since the master cylinder is connected to the hydraulic wheel brake under normal braking conditions and the hydraulic power source is connected to hydraulic wheel brake under anti-lock brake conditions, the brake operation member of the vehicle can achieve a sufficient stroke under the normal braking condition, and the stroke of the brake operation member does not vary in spite of the reduction and increment of the brake pressure of the wheel brake under the anti-lock braking condition. Further, because two valve members (the first and second valve members) are operated to connect the hydraulic power source to the hydraulic wheel brake, the brake force is prevented from being applied to the hydraulic wheel brake by malfunction of one of the valve members when the brake operation member of the vehicle is not operated.

Because electric control technology which rapidly develops is applied to anti-lock control engineering, a quick reduction mode and a slow increasing mode are mainly used as means for an adjustment of the brake. Since the valve member for permitting the flow of the brake fluid into the hydraulic wheel brake from the hydraulic power source is frequently switched to slowly increase the wheel brake, the valve member causes an operational noise. Further, a valve plunger and a valve seat which form the valve member are highly worn. Therefore, the valve plunger and the valve seat are made of an expensive highly wear proof material.

A hydraulic brake device for a vehicle which applies the brake force to each of the four wheels when the brake operation member of the vehicle is not operated to promote a vehicle stability is disclosed in Japanese Patent Laid Open No. 4(1992)-193658.

The hydraulic brake device for a vehicle disclosed in the above mentioned Japanese Patent Laid Open No. 64(1989)-47644 cannot supply the brake pressure to the front hydraulic wheel brakes when the brake operation member is not operated. Three valve members which are each of the 2-port, 2-position type (2-2 type valve member) must be added to the hydraulic brake device to permit the supply of brake pressure to the front hydraulic wheel brakes when the brake operation member is not operated and to prevent the brake pressure from being applied to the wheel brakes by malfunction of the valve members when the brake operation member of the vehicle is not operated. Therefore, two 3-port, 3-position type valve members (3-3 type valve members), a 3-port, 2-position type valve member (3-2 type valve member) and three 2-2 type valve members must be used in a front hydraulic brake circuit of the prior art. Although each 3-3 type valve member can be replaced by a 2-2 type valve member (normally open type) and a 2-2 type valve member (normally dose type), the front hydraulic brake circuit then requires a 3-2 type valve member and seven 2-2 type valve members. This causes the system to become quite expensive.

SUMMARY OF THE PRESENT INVENTION

In view of the foregoing, it would be desirable to provide a hydraulic brake device for a vehicle which can reduce the valve operational noise.

A need is also exists for a hydraulic brake device for a vehicle which can apply brake pressure to each of the four wheels independently even though a brake operation member is not operated.

It would also be desirable to provide a hydraulic brake device for a vehicle which is small in size and light in weight.

It would be further advantageous to provide a hydraulic brake device for a vehicle which can be easily manufactured.

A further need exists to provide a brake device for a vehicle which is durable.

It would be highly advantageous to provide a hydraulic brake device for a vehicle which is simple in structure and low in cost.

To address the foregoing, a hydraulic brake device for a vehicle in accordance with this invention comprises a reservoir for storing brake fluid, a master cylinder connected to the reservoir for generating brake pressure responsive to an operation force of a brake operation member of the vehicle, a hydraulic power source connected to the reservoir for generating hydraulic pressure responsive to the operation force of the brake operation member of the vehicle, a wheel brake for applying a brake force to a wheel of the vehicle and a pressure control unit connecting the wheel brake to the master cylinder, the reservoir and the hydraulic power source to control brake fluid flow into the reservoir from the wheel brake and brake fluid flow into the wheel brake from the hydraulic power source. The pressure control unit further includes a first valve device for disconnecting the wheel brake from the master cylinder and connecting the wheel brake to a hydraulic wheel brake passage, a second valve device for disconnecting the hydraulic wheel brake passage from the hydraulic power source and connecting the hydraulic wheel brake passage to the reservoir, a third valve device for disconnecting the second valve device from the wheel brake, and an orifice for connecting the hydraulic power source to the first valve device bypassing the second valve device and the third valve device and restricting a quantity of the brake fluid which flows into the wheel brake from the hydraulic power source so that the quantity of the brake fluid flowing through orifice to the wheel brake is smaller than the quantity of the brake fluid which flows into the reservoir from the wheel brake through the first, second and third valve devices.

In accordance with another aspect of the invention, a hydraulic brake device for a vehicle comprises a reservoir for storing brake fluid, a pump for pumping out brake fluid in the reservoir to generate hydraulic pressure, a regulator valve for regulating the hydraulic pressure in response to an operation force of a brake operation member of the vehicle, a master cylinder for generating brake pressure responsive to the operation force of the brake operation member, a front left wheel brake for being mounted on a front left wheel of the vehicle, a front right wheel brake for being mounted on a front right wheel of the vehicle and a pressure control unit for increasing and decreasing the brake pressure in the front left wheel brake and the front right wheel brake. The pressure control unit further includes a first valve device for disconnecting the front left wheel brake from the master cylinder and connecting the front left wheel brake to a front left hydraulic wheel brake passage, a second valve device for disconnecting the front right wheel brake from the master cylinder and connecting the front right wheel brake to a front right hydraulic wheel brake passage, a third valve device for selecting the regulator valve or the pump, a fourth valve device for disconnecting the front left and front right hydraulic wheel brake passages from the third valve device and connecting the front left and right hydraulic wheel brake passages to the reservoir, a fifth valve device for disconnecting the fourth valve device from the front left wheel brake, a sixth valve device for disconnecting the fourth valve device from the front right wheel brake, a first orifice for connecting the third valve to the front left hydraulic wheel brake passage bypassing the fourth and fifth valve devices and restricting a quantity of the brake fluid which flows into the front left wheel brake from the third valve device so that the quantity of the brake fluid flowing through the orifice to the front left wheel brake is smaller than the quantity of the brake fluid which flows into the reservoir from the front left wheel brake through the fifth and fourth valve devices, a second orifice for connecting the third valve to the front right hydraulic wheel brake passage bypassing the fourth and sixth valve devices and restricting a quantity of the brake fluid which flows into the front right wheel brake from the third valve device so that the quantity of the brake fluid flowing through the orifice to the front right wheel brake is smaller than the quantity of the brake fluid which flows into the reservoir from the front right wheel brake through the sixth and fourth valve devices.

BRIEF DESCRIPTION OF THE DRAWINGS

The features and advantages of the hydraulic brake device for a vehicle according to the present invention will be clearly appreciated from the following description in conjunction with the accompanying drawings wherein.

DETAILED DESCRIPTION OF PREFERRED EMBODIMENTS OF THE INVENTION

Figure 1:
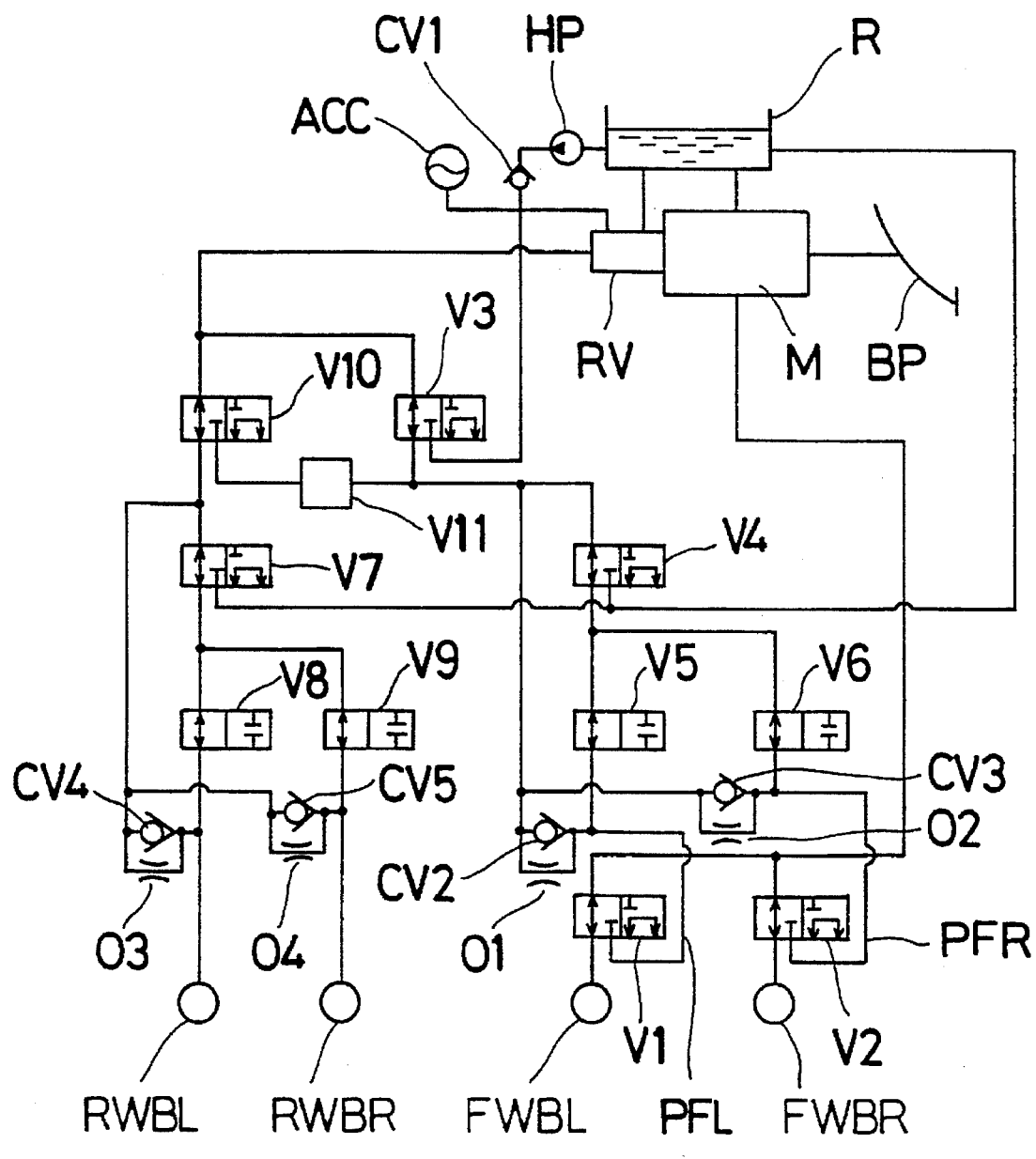
FIG. 1 is a circuit diagram of a hydraulic brake device for a vehicle according to the embodiment of the present invention.

An embodiment of the hydraulic brake device for a vehicle of the present invention is shown in FIG. 1. As seen in FIG. 1, a master cylinder M is connected to a reservoir R which stores brake fluid and supplies brake fluid to the master cylinder M. The master cylinder M is connected to a brake pedal BP, which functions as a brake operation member of a vehicle, in order to generate brake pressure in proportion to the depressing force applied to the brake pedal BP as a brake operation force. A hydraulic pump HP is connected to the reservoir R and is driven by an electric motor (not shown) to pump out the brake fluid in the reservoir R to an accumulator ACC through a check valve CV1. A regulator valve RV is connected to the accumulator ACC and the reservoir R. The regulator valve RV is supplied with the brake pressure generated by the master cylinder M as a pilot pressure to discharge power pressure in proportion to the brake pressure generated by the master cylinder M. A power pressure source is formed with the hydraulic pump HP, the check valve CV1, the accumulator ACC and the regulator valve RV.

Figure 2:
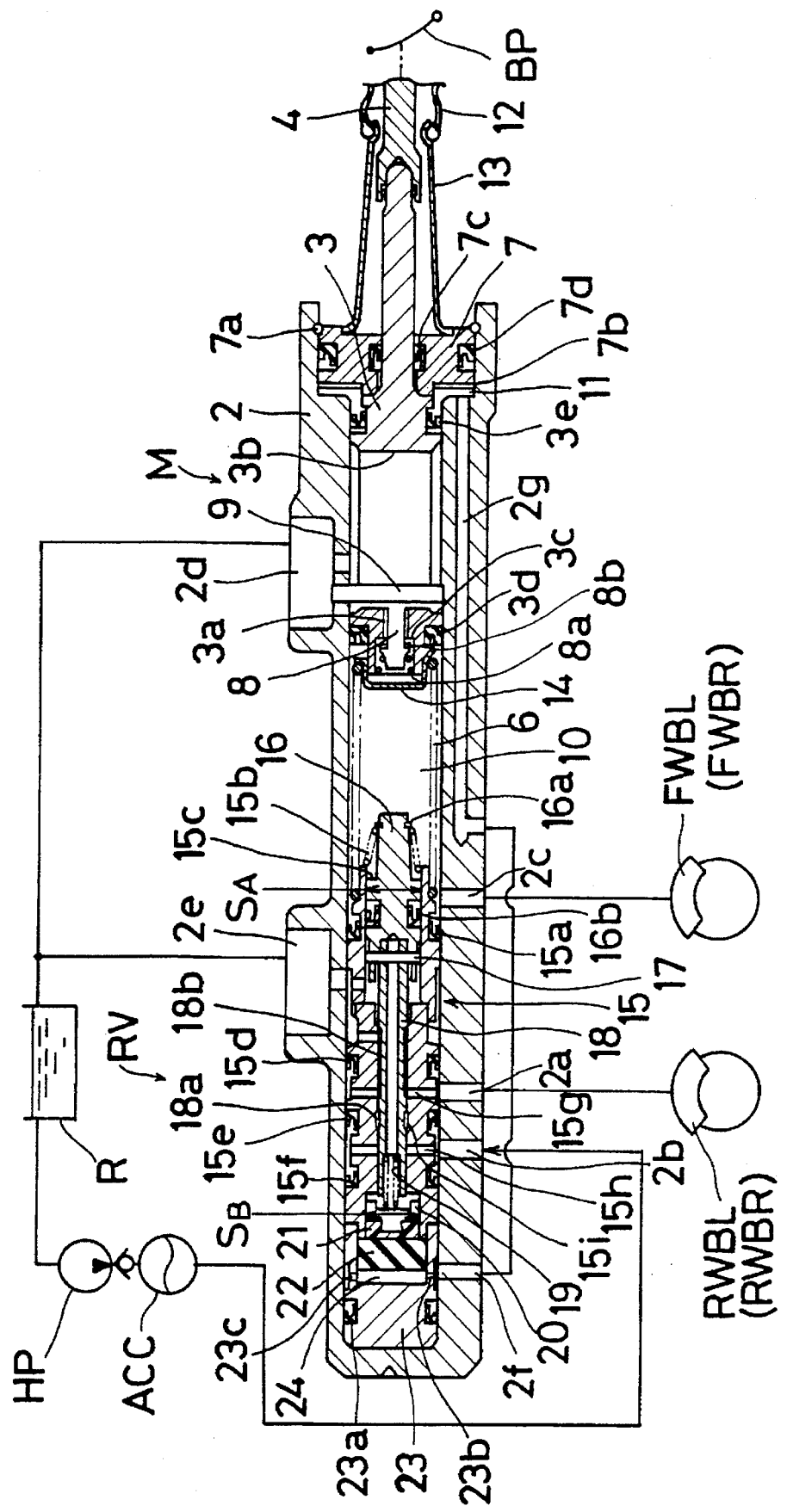
FIG. 2 is a sectional view of a master cylinder and a regulator valve of the hydraulic brake device of the present invention.

The master cylinder M and the regulator valve RV are illustrated in more detail in FIG. 2. A first piston 3 slidably disposed in a cylinder body 2 and is connected to a brake pedal BP through a push rod 4. The first piston 3 is biassed by a return spring 6 to be in contact with a plate member 7 which is prevented from moving in the right direction by a snap ring 7a. A stopper 7b is disposed at the left side of the plate member 7 as shown in FIG. 2 for limiting leftward movement of the plate member 7.

The first piston 3 includes a connecting passage 3a into which an inlet valve 8 is inserted. The inlet valve 8 is biassed by a spring 8a and is in contact with a pin 9 which is fixed to the cylinder body 2 and which is inserted into a through hole 3b of the first piston 3. Under the condition shown in FIG. 2, a valve portion 8b of the inlet valve 8 is not in contact with a valve seat 3c provided on the first piston 3.

Seal cups 3d, 3e are mounted on the respective left and right portions of the first piston 3. The plate member 7 includes an inner seal cup 7c and an outer seal cup 7d. With the above seal cups 3d, 3e, 7c and 7d, a pressure chamber 10 is formed at the left side of the first piston 3 and an auxiliary pressure chamber 11 is formed between the right side of first piston 3 and the plate member 7.

A boot 12 is provided to separate the inside of the brake pressure generating device for a vehicle 1 from an outside thereof. A retainer 13 is connected to the boot 12 to support the boot 12 and to prevent the push rod 4 from becoming radially inclined. Further, a cup retainer 14 is engaged with the first piston 3 to connect or associate the return spring 6 and the first piston 3 and to prevent the cup seal 3d from being disengaged from the first piston 3.

A sleeve member 15 is forced by the return spring 6 to be in contact with a left end portion of the cylinder body 2. The sleeve member 15 includes a seal cup 15a which forms the pressure chamber 10 with the first piston 3. A second piston 16 is slidably disposed in the sleeve member 15. The second piston 16 is biassed in the right direction relative to the sleeve member 15 to be in contact with a stopper 15c by a piston spring 15b which is engaged with a snap ring 16a.

The second piston 16 includes a seal cup 16b for forming the pressure chamber 10 and for receiving the pressure in the pressure chamber 10 so as to moved in the left direction shown in FIG. 2. The second piston 16 is connected to a spool valve 18 through a pin 17 in order that the spool valve 18 can be moved integrally with the second piston 16.

A piston return member 20 is connected to a left end of the spool valve 18 through a spring 19. A reaction member 21 which is formed in trapezoid shaped configuration is mounted on the piston return member 20 to form restriction means. The reaction member 21 is biassed by the spring 19 to contact an elastic member 22 (made of rubber or the like) which forms the restriction means. A retainer 23 is fixed to the sleeve member 15 to prevent the sleeve member 15 from moving. The retainer 23 includes a seal cup 23a and passages 23b, 23c. The elastic member 22 forms a regulated pressure chamber 24 with the retainer 23.

The sleeve member 15 further includes seal cups 15d, 15e and 15f which are arranged from the right to left as seen in FIG. 2. An outlet port 15g is disposed between the seal cups 15d, 15e for being connected to a rear wheel brake RWBL (RWBR) of the vehicle. Further, an inlet port 15h is disposed between the seal cups 15e, 15f into which a brake fluid charged in the accumulator ACC is introduced. The brake fluid in the reservoir R is pressurized by the hydraulic pump HP in order to charge into the accumulator ACC. The outlet port 15g and the inlet port 15h are respectively connected to an outlet port 2a and an inlet port 2b disposed on the cylinder body 2. The cylinder body 2 includes an outlet port 2c connected to a front wheel FWBL (FWBR). Further, the cylinder body 2 includes inlet ports 2d, 2e both of which are connected to the reservoir R.

The spool valve 18 includes a first groove 18a and a second groove 18b. The sleeve member 15 also includes a groove 15i. The outlet port 2a is connected to a port 2f which is connected to the regulated pressure chamber 24. The outlet port 2a is further connected to the auxiliary pressure chamber 11 through a passage 2g.

The operation of the brake pressure generating device 1 for a vehicle will be described hereinafter. When the brake pedal BP is operated, the first piston 3 is moved in the leftward direction shown in FIG. 2 through the push rod 4. Therefore, since the inlet valve 8 is separated from the pin 9, the valve portion 8b is contacted with the valve seat 3c by an elastic force of the spring 8a so as to separate the pressure chamber 10 from the reservoir R.

Later, the brake pressure PM is generated in the pressure chamber 10 because of a decrease of capacity of the pressure chamber 10 according to a stroke of the piston 3. At this time, the second piston 16 receives a force PM×SA (SA: sectional area of the second piston 16) and is moved in the leftward direction shown in FIG. 2 since the second piston 16 receives the brake pressure PM in the pressure chamber 10.

The spool valve 18 is moved integrally with the second piston 16 in the leftward direction because the spool valve 18 is fixed to the second piston 16 through the pin 17. Therefore, the spool valve 18 compresses the spring 19 and contacts the piston return member 20. The first groove 18a of the spool member 18 is connected to the inlet port 15h of the sleeve member 15 by movement of the spool valve 18 in order to connect the inlet port 15h and the groove 15i of the sleeve member 15 through the first groove 18a. On the other hand, the second groove 18b is connected to the groove 15i to connect the groove 15i and the outlet port 15g through the second groove 18b. Therefore, the inlet port 15h is connected to the outlet port 15g by the movement of the spool valve 18. Consequently, the brake pressure in the accumulator ACC is slowly introduced into the regulated pressure chamber 24 from the outlet pore 2a through the port 2f because the inlet port 2b is connected to the outlet port 2a through the inlet port 15h, the first groove 18a, the groove 15i, the second groove 18b and the outlet port 15g.

The pressure in the regulated pressure chamber 24 forces the elastic member 22 to move the spool valve 18 in the rightward direction through the reaction member 21 and the piston return member 20 against the brake pressure PM in the pressure chamber 10. The spool valve 18 is balanced when the pressure forces which the spool valve 18 receives from the pressure chamber 10 and the regulated pressure chamber 24 are equal.

At this time, when the area of the elastic member 22 in contact with the reaction member 21 represented by SV, the relationship between the pressure PM in the pressure chamber 10 and a regulated pressure PR introduced into the regulated pressure chamber 24 from the accumulator 26 through the spool valve 18 is represented by the following formula (losses associated with the load of the return spring 6 or the like are omitted.).

$$PM \times SA = PR \times SV$$

Therefore, the regulated pressure PR introduced into the regulated pressure chamber 24 is shown as follows.

$$PR = PM \times SA/SV$$

When the regulated pressure PR in the regulated pressure chamber 24 is not very large, the area SV of the elastic member 22 in contact with the reaction member 21 is not so large because the elastic member 22 is not strongly forced toward the reaction member 21. However, the area SV of the elastic member 22 becomes larger according to the increase of the regulated pressure PR until the area PV becomes a maximum valve SB. Therefore, the characteristic of a relationship between the brake pressure PM in the pressure chamber 10 and the regulated pressure PR in the regulated pressure chamber 24 is represented by a calm curve X shown in FIG. 3. The characteristic can be varied by altering the consistency of the elastic member 22 or a shape of a portion of the reaction member 21 contacted with the elastic member 22.

When the area of the reaction member 21 is contacting with the elastic member 22 becomes SB, the regulated pressure PR is represented by the following formula.

$$PR = PM \times SA/SB$$

Figure 3:
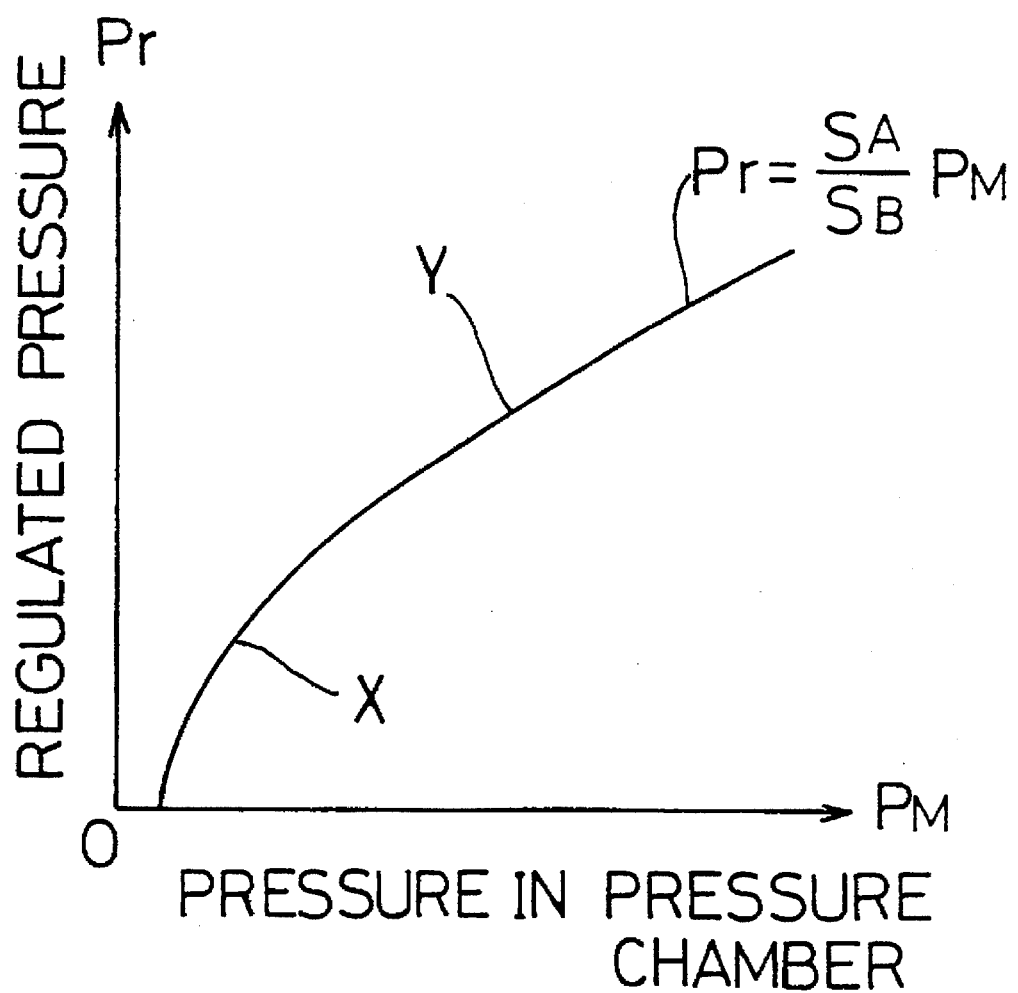
FIG. 3 is a diagram showing a characteristic between the pressure in a pressure chamber of the master cylinder and the pressure regulated by the regulator valve.

From then on, the regulated pressure PR increases linearly according to the increase of the brake pressure PM in the pressure chamber 10 because values SA, SB are constant (See Y in FIG. 3.). The characteristic of the relationship between the regulated pressure PR and the brake pressure PM (shown by an inclination of a line Y of FIG. 3) is varied of the sectional areas SA, SB of the second piston 16 and the reaction 21. Therefore, the characteristic of the brake pressure PM in the pressure chamber 10 relative to a brake pedal operating force can be varied.

The regulated pressure PR introduced into the regulated pressure chamber 24 from the accumulator ACC through the spool valve 18 is transmitted to the rear wheel brake RWBL (RWBR) and to the auxiliary pressure chamber 11 through the passage 2g so as to boost up the operation of the first piston 3. The brake pressure PM in the pressure chamber 10 is supplied to the front wheel brake FWBL (FWBR).

Referring to FIG. 1, the brake fluid usually flows into the front left wheel brake FWBL from the pressure chamber 10 of the master cylinder M through a 3-port, 2-position first valve V1 (3-2 type valve) which is operated by an electromagnetic solenoid. On the contrary, the brake fluid returns to the pressure chamber 10 of the master cylinder M from the front left wheel brake FWBL through the first valve V1, the fifth valve V5 (2-2 type valve) and the fourth valve V4 (3-2 type valve). Further, the brake fluid flows into the front right wheel brake FWBR from the pressure chamber 10 of the master cylinder M through a 3-port, 2-position second valve V2 (3-2 type valve) which is operated by an electromagnetic solenoid. On the contrary, the brake fluid returns to the pressure chamber 10 of the master cylinder M from the front right wheel brake FWBR through the second valve V2, the sixth valve V6 (2-2 type valve) and the fourth valve V4 (3-2 type valve).

The first valve V1 disconnects the front left wheel brake FWBL from a front left hydraulic wheel brake passage PFL to connect the front left wheel brake FWBL to the front left hydraulic wheel brake passage PFL when the first valve is not operated. However, when the first valve V1 is operated, the first valve V1 disconnects the front left wheel brake FWBL from the master cylinder M to connect the front left wheel brake FWBL to the front left hydraulic wheel brake passage PFL.

The second valve V2 disconnects the front right wheel brake FWBR from a front right hydraulic wheel brake passage PFR to connect the front right wheel brake FWBR to the front right wheel brake passage PFR when the second valve V2 is not operated. When the second valve V2 is operated, the second valve V2 disconnects the front right wheel brake FWBR from the master cylinder M to connect the front right wheel brake FWBR to the front right hydraulic wheel brake passage PFR.

A 3-2 type third valve V3 which is operated by an electromagnetic solenoid selects either the regulator valve RV or the accumulator ACC as the hydraulic pressure source supplied to the front left and right hydraulic wheel brake passages PFL, PFR. The third valve V3 normally selects the regulator valve RV.

A 3-2 type fourth valve V4 which is operated by an electromagnetic solenoid disconnects the front left and right hydraulic wheel brake passages PFL, PFR from the third valve V3 to connect the front right and left hydraulic wheel brake passages PFL, PFR to the reservoir R. The fourth valve V4 normally connects the front left and right hydraulic wheel brake passages PFL, PFR to the third valve V3.

A normally open 2-2 type fifth and sixth valves V5, V6 which are operated by an electromagnetic solenoid disconnect the front left and right hydraulic wheel brake passages PFL, PFR from the forth valve V4, respectively.

When the brake pedal BP is operated, the master cylinder M generates the pressure in proportion to the brake force of the brake pedal BP. The pressure of the master cylinder M is applied to the front left and right wheel brakes FWBL, FWBR through the first and second valves V1, V2 respectively. The regulator valve RV generates a decreased pressure from the accumulator ACC and is applied to the front left hydraulic wheel brake passage PFL through the third, fourth and fifth valves V3, V4, V5 and to the front right hydraulic wheel brake passage PFR through the third, fourth and sixth valves V3, V4, V6.

When the first and second valves V1, V2 are operated under a brake condition, in order that the brake pressure generated by the regulator valve RV rapidly flows into the front left and right wheel brakes FWBL, FWBR, the front left wheel brake passage PFL is connected to the regulator valve RV through the fifth valve V5, the fourth valve V4 and the third valve V3 and the front right wheel brake passage PFR is connected to the regulator valve RV through the sixth valve V6, the fourth valve V4 and the third valve V3.

A first and second orifices O1, O2 are disposed in a brake circuit shown in FIG. 1 in order that the brake fluid slowly flows into the front wheel brakes FWBL, FWBR from the regulator valve R when the first valve V1 is operated. Further, the first and second orifices O1, O2 can adjust the quantity of the brake fluid which flows into each of the front wheel brakes FWBL, FWBR from the regulator valve RV through the third valve V3.

When the fourth valve V4 is operated under the brake condition, the fourth valve V4 disconnects the front hydraulic wheel brake passages PFL, PFR from the third valve V3 to connect the front hydraulic wheel brake passages PFL, PFR to the reservoir R.

When the first and fourth valves V1, V4 are operated, the first valve V1 disconnects the front left wheel brake FWBL from the master cylinder M to connect the front left wheel brake FWBL to the front left hydraulic wheel brake passage PFL and the fourth valve V4 disconnects the front left hydraulic wheel brake passage PFL from the third valve V3 to connect the front left hydraulic wheel brake passage PFL to the reservoir R. The brake fluid flows into the reservoir R from the front left wheel brake FWBL through the first, fifth and fourth valves V1, V5, V4. At the same time, the regulated brake fluid flows into the front left hydraulic wheel brake passage PFL from the regulator valve RV through the third valve V3 and the first orifice O1. The first orifice O1 restricts the quantity of brake fluid which flows into the front left wheel brake FWBL from the regulator valve RV through the third valve V3 in order that the quantity of brake fluid is smaller than that of the brake fluid which flows into the reservoir R from the front left wheel brake FWBL through the first, fourth and fifth valves V1, V4, V5. Thus the pressures of the front left wheel brake FWBL is rapidly decreased.

When the second and fourth valves V2, V4 are operated, the second valve V2 disconnects the front right wheel brake FWBR from the master cylinder M to connect the front right wheel brake FWBR to the front right hydraulic wheel brake passage PFR and the fourth valve V4 disconnects the front right hydraulic wheel brake passage PFR from the third valve V3 to connect the front right hydraulic wheel brake passage PFR to the reservoir R. The brake fluid flows into the reservoir R from the front right wheel brake FWBR through the second, sixth and fourth valves V2, V6, V4. At the same time, the regulated brake fluid flows into the front right hydraulic wheel brake passage PFR from the regulator valve RV through the third valve V3 and the second orifice O2. The second orifice O2 restricts the quantity of brake fluid which flows into the front right wheel brake FWBR from the regulator valve RV through the third valve V3 in order that the quantity of brake fluid is smaller than that of the brake fluid which flows into the reservoir R from the front right wheel brake FWBR through the second, fourth and sixth valves V2, V4, V6. Thus the pressures of the right wheel brake FWBR is rapidly decreased.

When the first and fourth valves V1, V4 are operated and now the fifth valve V5 is operated, the brake fluid into the reservoir R from the front left wheel brake FWBL is stopped to flow. The brake pressure generated by the regulator RV is slowly transmitted to the front left wheel brake FWBL through the third valve V3 and the first orifice O1. Thus the pressure of the front left wheel brake FWBL is calmly increased.

When the second and fourth valves V2, V4 are operated and now the sixth valve V6 is operated, the brake fluid into the reservoir R from the front right wheel brake FWBR is stopped to flow. The brake pressure generated by the regulator RV is slowly transmitted to the front right wheel brake FWBR through the third valve V3 and the second orifice O2. Thus the pressure of the front right wheel brake FWBL is calmly increased.

When the first, fifth and fourth valves V1, V5, V4 are operated and now the fifth valve V5 is released, the pressure of the front left wheel brake FWBL is rapidly decreased again. When the second, sixth and fourth valves V2, V6, V4 are operated and now the sixth valve V6 is released, the pressure of the front right wheel brake FWBR is rapidly decreased again.

When the first, second and third valves V1, V2, V3 are operated and the brake pedal BP is not operated, a high pressure in the accumulator ACC is transmitted to the front left wheel brake FWBL through the third, fourth, fifth and first valves V3, V4, V5, V1 and is transmitted to the front right wheel brake FWBR through the third, fourth, sixth and second valves V3, V4, V6, V2 so that brake force is applied to the front wheel brakes FWBL, FWBR.

When the first and third valves V1, V3 are operated, a high pressure in the accumulator ACC is transmitted to the front left wheel brake FWBL through the third, fourth, fifth and first valves V3, V4, V5, V1 to apply a brake pressure to the front left wheel brake FWBL. When the second and third valves V2, V3 are operated, a high pressure in the accumulator ACC is transmitted to the front right wheel brake FWBR though the third, fourth, sixth and second valves V3, V4, V6, V2 to apply a brake pressure to the front right wheel brake FWBR.

When a high pressure in the accumulator ACC is transmitted to the front wheel brakes FWBL, FWBR and the fourth, fifth and sixth valves V4, V5, V6 are not operated, the pressure of the front brakes are rapidly increased, but if the fourth, fifth and sixth valves V4, V5, V6 are operated, the brake fluid slowly flows into the front wheel brakes FWBL, FWBR from the accumulator ACC through the orifices O1, O2. As a result, the brake pressures in the front wheel brakes are calmly increased.

In this embodiment, when the first, second and third valves V1, V2, V3 are operated, a high pressure in the accumulator ACC is applied to the front wheel brakes FWBL, FWBR while the brake pedal BP is not operated. Further, only when the both of the first and third vanes V1, V3 or the second and third valves V2, V3 are operated at the same time, a high pressure in the accumulator ACC is applied to the front wheel brakes FWBL, FWBR.

While the brake pedal BP is operated and the first or second valve V1, V2 is operated (anti-lock control), brake pressures in the front wheel brakes FWBL, FWBR are calmly increased or rapidly increased by controlling the fourth, fifth and sixth valves V4, V5, V6. The brake fluid slowly flows into the front left wheel brake FWBL from the accumulator ACC through the first orifice O1 when the first valve, fourth and fifth valves V1, V4, V5 are operated. The brake fluid slowly flows into the front right wheel brake FWBR from the accumulator ACC through the second orifice O2 when the second, fourth and sixth valves V2, V4, V6 are operated under the brake condition.

Each of check valves CV2, CV3 is provided in the brake circuit to be in parallel with each of the first and second orifices O1, O2. Therefore, the brake fluid quickly returns to the regulator valve RV from the front wheel brakes FWBL, FWBR in response to release of the brake pedal BP when the first and second valves V1, V2 are operated.

The regulator valve RV supplies brake pressure to a rear left wheel brake RWBL through a 3-2 type tenth valve V10 which is operated by an electromagnetic solenoid, a 3-2 type seventh valve V7 which is operated by an electromagnetic solenoid and a 2-2 type eighth valve V5. The regulator valve RV also supplies brake pressure to a rear right wheel brake RWBR through the tenth valve V10, the seventh valve V7 and a normally open 2-2 type ninth valve V9. The seventh valve V7 disconnects the rear wheel brakes RWBL, RWBR from the regulator valve RV to connect the rear brakes RWBL, RWBR to the reservoir R. The eighth and ninth valves V8, V9 disconnect the rear wheel brakes RWBL, RWBR from the seventh valve V7. A third orifice O3 is disposed in the brake circuit to be in parallel with the seventh and eighth valves V7, V8. Therefore, the brake fluid slowly flows into the rear left wheel brake RWBL from the regulator valve RV or the accumulator ACC through the third orifice O3 when the eighth valve V8 is operated. A fourth orifice O4 is disposed in the brake circuit to be in parallel with the seventh and ninth valves V7, V9. Therefore, the brake fluid slowly flows into the rear right wheel brake RWBR form the regulator valve RV or the accumulator ACC through the fourth orifice O4 when the ninth valves V9 is operated.

The tenth valve V10 disconnects the seventh valve V7 and the orifices O3, O4 from the regulator valve RV to connect the rear wheel brakes RWBL, RWBR to the third valve V3. An eleventh valve V11 which is a proportional decreasing valve connects the regulator valve RV to the tenth valve V10 through the third valve V3 so that the regulator valve RV is connected to the rear wheel brakes RWBL, RWBR. An output pressure of the eleventh valve V11 is proportional to the input pressure (an output pressure of the third valve V3) until it reaches a fixed pressure. If an output pressure of the eleventh valve V11 (a pressure of the tenth valve V10) is greater than the fixed pressure, the pressure is modulated by a fixed decreasing rate in conjunction with the input pressure of the eleventh valve V11. The eleventh valve V11 is known to a proportional pressure valve. An output pressure of a pressure limit valve is proportional to the input pressure of the pressure limit valve until it reaches a fixed pressure. But if an output pressure of the pressure limit valve is greater than the fixed pressure, a pressure is limited to the fixed pressure. This valve is known to a limiting valve.

Check valves CV3, CV4 are provided in the brake circuit to be in parallel with the third and fourth orifices O3, O4, respectively. Therefore, the brake fluid quickly returns to the regulator valve RV from the rear Wheel brakes RWBL, RWBR in response to the release of the brake pedal BP when the seventh, eighth and ninth valves V7, V8, V9 are operated.

In the rear brake circuit, the rear left wheel brake RWBL is connected to the reservoir R through the eighth and seventh valves V8, V7 and the rear right wheel brake RWBR is connected to the reservoir R through the ninth and seventh valves V9, V7.

When the brake pedal BP is operated, the brake pressure generated by the regulator valve RV responsive to the brake force of the brake pedal BP is transmitted to the rear left wheel brake RWBL through the tenth, seventh and eighth valves V10, V7, V8, and is transmitted to the rear right wheel brake RWBR through the tenth, seventh and ninth valves V10, V7, V9. As a result, the braking force is applied to the rear wheels RWBL, RWBR. The brake force is increased or decreased in accordance with the brake pedal.

When the seventh and eighth valves V7, V8 are operated and the brake pedal BP is not operated, the brake fluid slowly flows into the rear wheel brakes from the regulator RV through the orifice O3, but the quantity of the brake fluid is smaller than that of the brake fluid which flows into the reservoir R from the rear wheel brake RWBL through the seventh and eighth valves V7, V8. As a result, the pressures of the rear wheel brakes are quickly decreased.

When the seventh and eighth valves V7, V8 are operated, the brake fluid does not flow into the rear left wheel brake RWBL from the regulator valve RV through the seventh valve V7, but the brake fluid flows into the rear left wheel brake RWBL from the regulator valve RV through the third orifice O3. Therefore, the pressure of the rear left wheel brake RWBL is slowly increased.

When the seventh and ninth valves V7, V9 are operated, the brake fluid does not flow the rear right wheel brake RWBR from the regulator valve RV through the ninth valve V9 but the brake fluid flows into the rear right wheel brake RWBR from the regulator valve RV through the fourth orifice O4. The pressure of the rear right wheel brake RWBR is slowly increased. Thus the pressure of the rear left wheel brake RWBL is increased or decreased when the seventh and eighth valves V7, V8 are operated and the pressure of the rear right wheel brake RWBR is increased or decreased when the seventh and ninth valves V7, V9 are operated.

When the seventh valve V7 is operated and the brake pedal BP is not operated, the brake fluid slowly flows into the rear wheel brakes from the accumulator ACC through the orifice O3, but the quantity of the brake fluid is smaller than that of the brake fluid which flows into the reservoir R from the rear wheel brake RWBL through the seventh valve V7. As a result, the pressures of the rear wheel brakes are quickly decreased.

When the tenth and third valves V10, V3 are operated and the brake pedal BP is not operated, the tenth valve V10 disconnects the seventh valve V7 and orifices O3, O4 from the regulator valve RV to connect the accumulator ACC to the rear wheel. A high pressure in the accumulator ACC is transmitted to the rear left wheel brake RWBL through the third, seventh and eighth valves V3, V7, V8 and to the rear right wheel brake RWBR through the third, seventh and ninth valves V3, V7, V9.

When the third valve V3 is operated but the tenth valve V10 is not operated, the brake fluid which flows into the rear wheel brakes RWBL, RWBR from the accumulator ACC returns to the regulator valve RV so that the pressures of the rear wheel brakes RWBL, RWBR are not increased.

When the tenth and third valves V10, V3 are operated and if the seventh valve V7 is operated, the brake fluid flows into the rear left wheel brake from the accumulator ACC through the orifice O3, but the quantity of the brake fluid is smaller than that of the brake fluid which flows into the reservoir R from the rear wheel brakes RWBL, RWBR through the seventh valves V7. Therefore, the pressures of the rear wheel brakes RWBL, RWBR are rapidly decreased.

When the seventh, tenth and third valves V7, V10, V3 are operated and then if the eighth valve V8 is operated, the brake fluid which flows into the reservoir R from She rear left wheel brake RWBL is stopped, a high pressure in the accumulator ACC is transmitted to the rear left wheel brake RWBL through the third valve V3, the tenth valve V10 and the third orifice O3. Therefore, the pressure of the rear left wheel brake RWBL is slowly increased. In the same way, when the seventh, tenth and third valves V7, V10, V3 are operated and then if the ninth valve V9 is operated, the brake fluid which flows into the reservoir R from the rear right wheel brake RWBR is stopped. A high pressure in the accumulator ACC transmits to the rear right wheel brake RWBR through the third valve V3, the tenth valve V10 and the fourth orifice O4. Therefore, the pressure of the rear right wheel brake RWBR is slowly increased.

The valves V1 to V10 are operated by an electric control device (not shown). When the brake pedal BP is operated, the electric control device operates the valves V1, V2, V4, V5 and V6 to control the pressures of the front brakes FWBL, FWBR based on wheel speed signals output from wheel speed sensors (not shown) which are mounted on the front wheels. Further, the electric control device operates the valves V7, V8 and V9 to control the pressures of the rear wheel brakes RWBL, RWBR based on wheel speed signals output from rear wheel speed sensors (not shown) which are mounted on the rear wheels (Anti-lock control). In accordance with the above operations, the front and rear wheels are prevented from being locked.

Further, when the brake pedal BP is not operated, the electric control device operates the valves V7, V8 and V9 to control the pressures of the rear wheel brakes RWBL, RWBR based on wheel speed signals output from rear wheel speed sensors (Traction control). In accordance with the above operations, the rear wheels are prevented from being slipped when the vehicle starts.

Further, when the vehicle runs on a curve, the electric control device operates the valves V1, V2, V4, V5 and V6 to supply the brake pressures to the front wheel brakes FWBL, FWBR based on signals output from the wheel speed sensors, a front steering angle sensor, a longitudinal acceleration sensor, a lateral acceleration sensor and a yaw rate sensor or the like (Stability control).

When the vehicle is running on the curve under no-brake condition, the brake pressure in the accumulator ACC is transmitted to the front wheel brakes FWBL, FWBR from the accumulator ACC through the valves (V1, V2, V3, V4, V5, V6) to prevent the vehicle from being under an oversteering condition.

When the vehicle starts running in response to release of the brake pedal BP, the brake pressure in the accumulator ACC is transmitted to the rear wheel brakes RWBL, RWBR through the third, tenth, seventh, eighth and ninth valves V3, V10, V7, V8, V9 to increase the brake pressure in the rear wheel brakes RWBL, RWBR. The rear wheels are prevented from being slip. In accordance with the above operations, stability of the vehicle can be achieved or promoted.

In accordance with this invention, the hydraulic control unit is formed by six 3-2 type valves, four 2-2 type valves, four orifices and a proportional pressure valve or a limiting valve. As the brake fluid flows into the wheel brake from the hydraulic power source (accumulator or regulator) through the orifice, the valve operation does not cause an operational noise and a valve plunger and a valve seat which form the valve member are not highly worn. Therefore, these valve plunger and seat can be made without using an expensive high wear proof material.

In accordance with the present invention, the device can independently control the pressures of four wheel brakes FWBL, FWBR, RWBL, RWBR to operate an anti-lock control, a traction control and a stability control which are not interfered at all each other.

Figure 4:
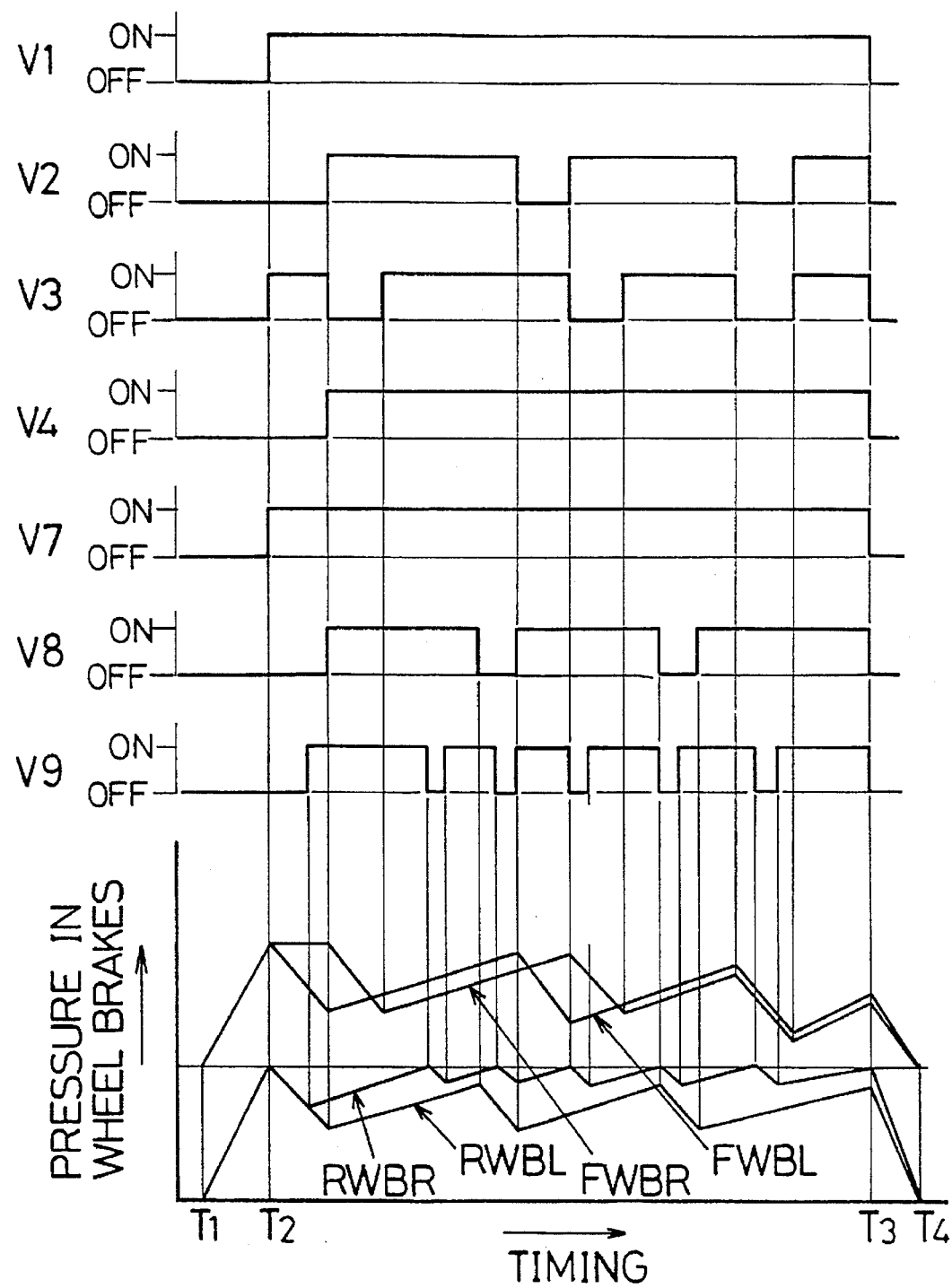
FIG. 4 is a time chart showing an anti-lock control operation of the hydraulic brake device according to the embodiment of the present invention.

The brake pressure of the wheel brakes FWBL, FWBR, RWBL, RWBR vary in response to the operations of the valves under the brake condition as shown in FIG. 4.

Figure 5:
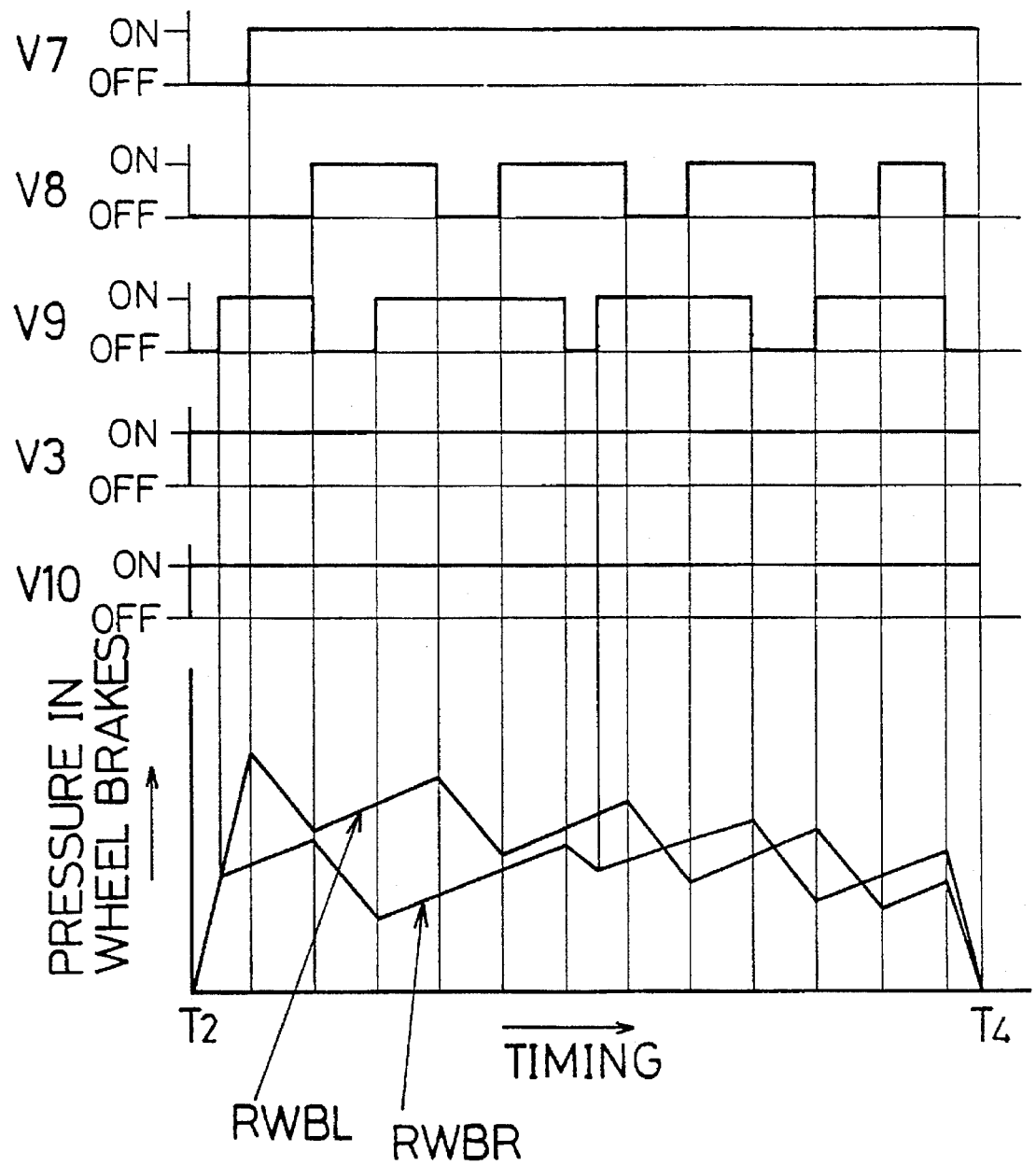
FIG. 5 is a time chart showing a traction control operation of the hydraulic brake device according to the embodiment of the present invention.

The brake pressure of the rear wheel brakes RWBL, RWBR vary in response to the operations of the valves under the traction control operation as shown in FIG. 5.

Figure 6:
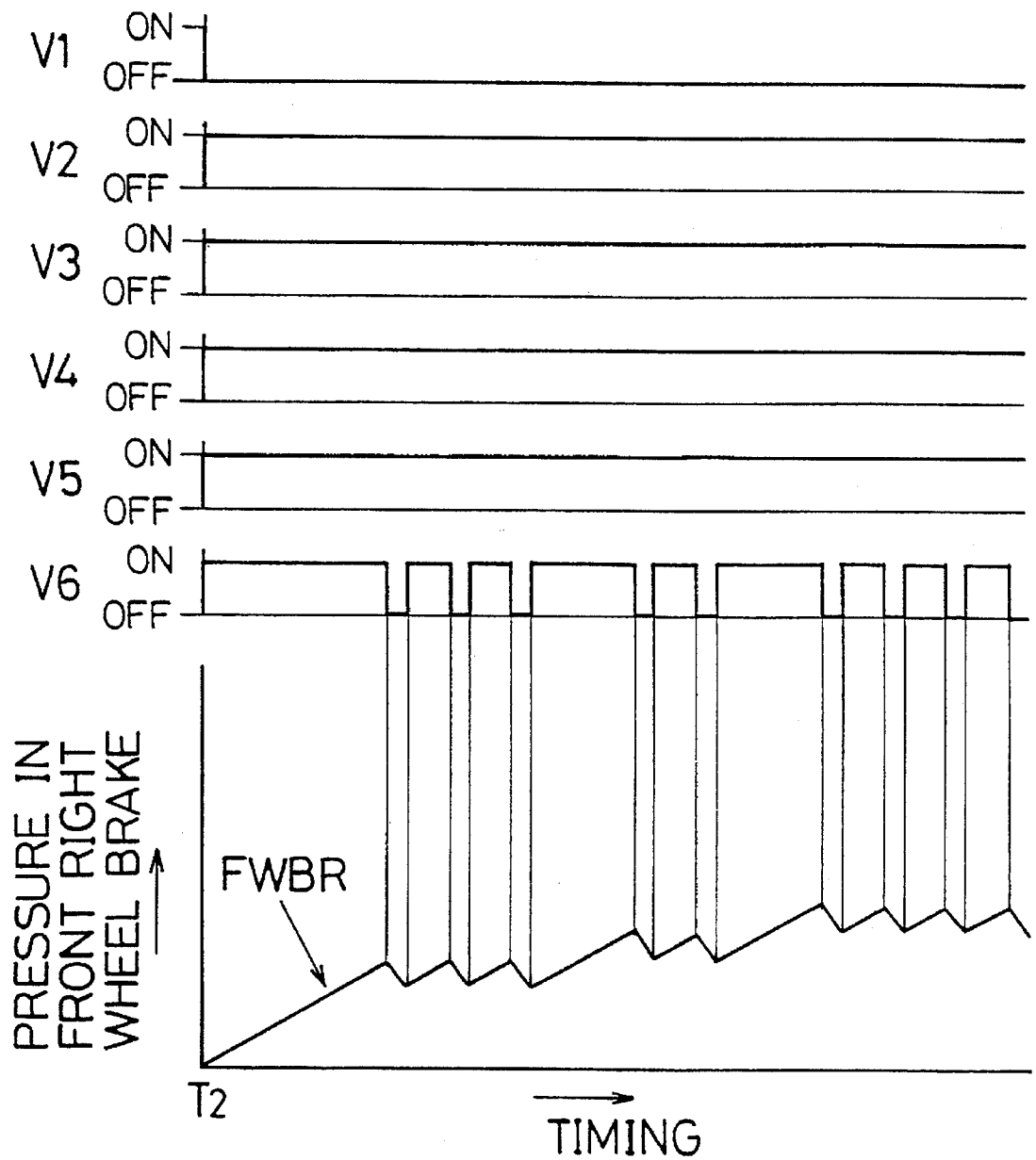
FIG. 6 is a time chart showing a stability control operation of the hydraulic brake device according to the embodiment of the present invention.

The brake pressure of the wheel brakes FWBL, FWBR, RWBL, RWBR vary in response to the operations of the valves under the stability control as shown in FIG. 6.

T1, T2, T3, T4 indicate a start timing of the brake operation, a start timing of the brake control, a finish timing of the brake control, a finish timing of the brake operation respectively in FIGS. 4, 5 and 6.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic brake device for a vehicle comprising:
a reservoir for storing brake fluid;
a master cylinder connected to the reservoir for generating brake pressure responsive to an operation force of a brake operation member of the vehicle;
a hydraulic power source connected to the reservoir for generating hydraulic pressure responsive to the operation force of the brake operation member of the vehicle;
a wheel brake for applying a brake force to a wheel of the vehicle; and
a pressure control unit connecting the wheel brake to the master cylinder, the reservoir and the hydraulic power source to control brake fluid flow into the reservoir from the wheel brake and brake fluid flow into the wheel brake from the hydraulic power source, the pressure control unit including
a first valve device for disconnecting the wheel brake from the master cylinder and connecting the wheel brake to a hydraulic wheel brake passage,
a second valve device for disconnecting the hydraulic wheel brake passage from the hydraulic power source and connecting the hydraulic wheel brake passage to the reservoir,
a third valve device for disconnecting the second valve device from the wheel brake, and
an orifice for connecting the hydraulic power source to the first valve device bypassing the second valve device and the third valve device and restricting a quantity of the brake fluid which flows into the wheel brake from the hydraulic power source so that the quantity of the brake fluid flowing through orifice to the wheel brake is smaller than the quantity of the brake fluid which flows into the reservoir from the wheel brake through the first, second and third valve devices.

2. A hydraulic brake device for a vehicle comprising:
a reservoir for storing brake fluid;
a pump for pumping out brake fluid in the reservoir to generate hydraulic pressure;
a regulator valve for regulating the hydraulic pressure in response to an operation force of a brake operation member of the vehicle;
a master cylinder for generating brake pressure responsive to the operation force of the brake operation member;
a front left wheel brake for being mounted on a front left wheel of the vehicle;
a front right wheel brake for being mounted on a front right wheel of the vehicle; and
a pressure control unit for increasing and decreasing the brake pressure in the front left wheel brake and the front right wheel brake, the pressure control unit including
a first valve device for disconnecting the front left wheel brake from the master cylinder and connecting the front left wheel brake to a front left hydraulic wheel brake passage,
a second valve device for disconnecting the front right wheel brake from the master cylinder and connecting the front right wheel brake to a front right hydraulic wheel brake passage,
a third valve device for selecting the regulator valve or the pump,
a fourth valve device for disconnecting the front left and right hydraulic wheel brake passages from the third valve device and connecting the front left and right hydraulic wheel brake passages to the reservoir,
a fifth valve device for disconnecting the fourth valve device from the front left wheel brake,
a sixth valve device for disconnecting the fourth valve device from the front right wheel brake;
a first orifice for connecting the third valve to the front left hydraulic wheel brake passage bypassing the fourth and fifth valve devices and restricting a quantity of the brake fluid which flows into the front left wheel brake from the third valve device so that the quantity of the brake fluid flowing through the orifice to the front left wheel brake is smaller than the quantity of the brake fluid which flows into the reservoir from the front left wheel brake through the fifth and fourth valve devices, a second orifice for connecting the third valve to the front right hydraulic wheel brake passage bypassing the fourth and sixth valve devices and restricting a quantity of the brake fluid which flows into the front right wheel brake from the third valve device so that the quantity of the brake fluid flowing through the orifice to the front right wheel brake is smaller than the quantity of the brake fluid which flows into the reservoir from the front right wheel brake through the sixth and fourth valve devices.

3. A hydraulic brake device for a vehicle as recited in claim 2, further comprising:

a rear left wheel brake for being mounted on a rear left wheel;

a rear right wheel brake for being mounted on a rear right wheel; and a second pressure control unit for increasing and decreasing the brake pressure in the rear left wheel brake and the rear right wheel brake, the second pressure control unit including a seventh valve device for disconnecting the rear left and right brakes and connecting the rear left and rear right brakes to the reservoir, an eighth valve device for disconnecting the seventh valve device from the rear left wheel brake, a ninth valve device for disconnecting the seventh valve device from the rear right wheel brake, a third orifice for restricting a quantity of the brake fluid which flows into the rear left wheel brake from the pump or the regulator valve so that a quantity of the brake fluid flowing through the orifice to the rear left wheel brake is smaller than the quantity of the brake fluid which flows into the reservoir from the rear left wheel brake through the seventh and eighth valve devices, a fourth orifice for restricting a quantity of the brake fluid which flows into the rear right wheel brake from the pump or the regulator valve so that a quantity of the brake fluid flowing through the orifice to the rear right wheel brake is smaller than the quantity of the brake fluid which flows into the reservoir from the rear right wheel brake through the seventh and ninth valve devices, a tenth valve device for disconnecting the seventh valve device and the third and forth orifices from the regulator valve and connecting the third valve device to the seventh valve device, the third and forth orifices.

4. A hydraulic brake device for a vehicle as recited in claim 3, further comprising:

a proportional valve is disposed between the third valve device and the tenth valve device.

* * * * *